(12) United States Patent
Kalwara et al.

(10) Patent No.: US 9,296,924 B2
(45) Date of Patent: Mar. 29, 2016

(54) STATIC DISSIPATIVE RELEASE LINER

(75) Inventors: Joseph J. Kalwara, Indianapolis, IN (US); John W. Fieldhouse, Carmel, IN (US)

(73) Assignee: Firestone Building Products Company, LLC, Indianapolis, IN (US)

(*) Notice: Subject to any disclaimer, the term of this patent is extended or adjusted under 35 U.S.C. 154(b) by 1070 days.

(21) Appl. No.: 12/495,075

(22) Filed: Jun. 30, 2009

(65) Prior Publication Data

US 2010/0003443 A1    Jan. 7, 2010

Related U.S. Application Data

(60) Provisional application No. 61/077,360, filed on Jul. 1, 2008.

(51) Int. Cl.
| | |
|---|---|
| *B32B 9/00* | (2006.01) |
| *C09J 7/02* | (2006.01) |
| *B32B 7/06* | (2006.01) |
| *B32B 7/12* | (2006.01) |
| *B32B 27/08* | (2006.01) |
| *B32B 27/18* | (2006.01) |
| *B32B 27/30* | (2006.01) |
| *B32B 27/32* | (2006.01) |
| *B32B 27/36* | (2006.01) |
| *B32B 3/02* | (2006.01) |

(52) U.S. Cl.
CPC .............. *C09J 7/0225* (2013.01); *B32B 3/02* (2013.01); *B32B 7/06* (2013.01); *B32B 7/12* (2013.01); *B32B 27/08* (2013.01); *B32B 27/18* (2013.01); *B32B 27/302* (2013.01); *B32B 27/32* (2013.01); *B32B 27/36* (2013.01); *B32B 2264/108* (2013.01); *B32B 2307/202* (2013.01); *B32B 2307/7265* (2013.01); *B32B 2307/748* (2013.01); *B32B 2419/06* (2013.01); *Y10T 428/1476* (2015.01); *Y10T 428/31504* (2015.04); *Y10T 428/31786* (2015.04); *Y10T 428/31938* (2015.04)

(58) Field of Classification Search
CPC .............. B32B 7/06; B32B 7/12; B32B 27/08
USPC ...................................... 428/40.1, 41.7, 41.8
See application file for complete search history.

(56) References Cited

U.S. PATENT DOCUMENTS

| | | | |
|---|---|---|---|
| 5,456,972 | A | 10/1995 | Roth et al. |
| 5,514,299 | A | 5/1996 | Kalwara |
| 6,106,659 | A | 8/2000 | Spence et al. |
| 6,429,595 | B1 | 8/2002 | Hammen et al. |

(Continued)

OTHER PUBLICATIONS

NFPA 77 "Recommended Practice on Static Electricity", NFPA, Quincy, MA, 2007 Edition, p. 77-17.
Seeming Technique for Chemically Resistant, Reusable, Vacuum Bag Material, Arlon Technologies Division, Bear, DE, dated Feb. 2, 2006, pp. 6-7.

(Continued)

*Primary Examiner* — Victor Chang
(74) *Attorney, Agent, or Firm* — Jason A. Houser; Arthur M. Reginelli

(57) ABSTRACT

A laminate for creating a waterproof system, the laminate including a polymeric layer and a release liner removably attached to the polymeric layer, where the release liner includes a conductive or semi-conductive material. The polymeric layer may also include a prepared surface on a portion thereof, the release liner being positioned over the prepared surface. The prepared surface may include a layer of primer residue or adhesive.

14 Claims, 1 Drawing Sheet

(56) References Cited

U.S. PATENT DOCUMENTS 6,982,107 B1 * 1/2006 Hennen .................. 428/40.1
2004/0169290 A1 * 9/2004 Takei et al. ............... 257/783
2007/0087153 A1 * 4/2007 Port et al. ................. 428/40.1

OTHER PUBLICATIONS

"Plasma3(TM) Atmospheric Plasma Surface Treating", Enercon Surface Treating Systems, Menomonee Falls, WI, dated Feb. 25, 2008.

* cited by examiner

STATIC DISSIPATIVE RELEASE LINER

This application claims the benefit of U.S. Provisional Application Ser. No. 61/077,360, filed Jul. 1, 2008, and is incorporated herein by reference.

FIELD OF THE INVENTION

One or more embodiments of this invention relate to release liners that are particularly useful for polymeric laminates including those that are employed in the roofing industry. The release liner has suitable static dissipative properties to reduce or eliminate the risk of electrostatic discharges that can occur during the removal of the release liner.

BACKGROUND OF THE INVENTION

The construction industry commonly uses single ply membranes to provide a waterproof barrier on flat or low-slope roofs. Because it is expensive and difficult to produce and transport a single membrane sized to cover an entire roof surface, a roof is typically covered by a plurality of individual membranes oriented in an overlapping arrangement. The overlapping portions, or splices, of the individual membrane panels are secured together to form a single waterproof surface.

In certain situations, the individual membrane panels can be joined together along overlapping longitudinal edges by using adhesive tapes sandwiched between the overlapping surface panels. In order to ensure that the tapes effectively bond the adjoining membrane panels, the areas where tape application occurs are commonly prepared using a primer that removes dirt and other debris, which may inhibit bonding. The adhesive tape typically carries a release liner that is removed on site to expose the adhesive surface of the tape and apply it to the membrane panels. The adhesive tape typically carries a release liner that protects the tape during storage, shipping, etc. before field application when the release liner is removed on site to expose the adhesive surface of the tape and apply it to the membrane panels.

In other situations, the individual membrane panels can carry a factory-applied adhesive tape along a longitudinal edge intended for overlapping with a longitudinal edge of a neighboring membrane panel. To protect the adhesive tape, the tape typically carries a protective release liner that must be removed to expose the adhesive so the membranes may be joined.

There is not only a need to attach the various membrane panels together in order to form a continuous waterproof surface, but there is also a need to secure the membrane to a roof substrate. Various attachment techniques are employed in the art.

For example, membrane panels can be fully adhered to the roof substrate (or to an intermediary surface such as a roof insulation that has been secured to the building deck). In certain situations, membrane panels include a factory-applied adhesive layer substantially covering one planer surface of the panel. The adhesive layer is typically protected by a release liner that must be removed in order to expose the adhesive to adhere the membrane to the surface substrate, which may include insulation board.

In other situations, attachment strips are secured to the roof or an intermediary layer of a roofing system by mechanical means (such as by use of a fastener and plate or a batten strip). The attachment strips can carry a layer of factory-applied adhesive that is typically covered by a release liner. During installation, the attachment strip is secured to the roof, the release liner is removed, and then the membrane panels are secured to the roof by adhering the membrane panel to the adhesive of the attachment strip.

In still other situations, membrane panels are secured to a roof deck or intermediary layer of a roofing system by employing mechanical means that directly engage or secure the membrane panel. Because these fastening systems pierce the membrane panel, they must be covered to ensure that waterproof integrity of the membrane system. This is typically accomplished by employing polymeric coverstrips that are secured to the membrane and cover the attachment mechanism. These coverstrips can carry or include a factory-applied adhesive that is protected by a release liner. During installation, the release liner is removed and the cover strip is applied to the membrane panel over the mechanical attachment device.

Repairs and detail work on a roof can be carried out using relatively narrow rolls of roof flashing. The flashing products can include a factory-applied adhesive layer that is protected by a release liner. Removal of the release liner exposes the adhesive and allows for placement and installation of the flashing.

Other articles employed in the roofing industry include walkway pads, which are typically planar polymeric devices that are secured to a rooftop in order to protect a roofing membrane. For example, walkway pads are often secured to the top of polymeric roofing systems (e.g. to the top side of a roofing membrane) in areas of high traffic or in locations where there is a likelihood that service personnel might perform routine work. The ability to properly secure these walkway pads to the rooftop is important because there is a potential for dislodging the walkway pads due to wind uplift affects of wind forces. It has been found advantageous to factory apply tape to the walkway pads in order to facilitate installation and ensure proper adhesion. The factory-applied tape is typically covered with a release liner that is removed prior to installation of the pad.

Release liners may include paper-based and polymeric-based films. The paper-based release liners can be coated with polymeric resins. The use of polymeric films or coatings is advantageous because they provide resistance to moisture, temperature fluctuations, aging, rough handling, and tear. But, static build-up can occur during the removal of a polymeric release liner, which sometimes results in a static discharge.

SUMMARY OF THE INVENTION

One or more embodiments of the present invention provides a laminate for creating a waterproof system, the laminate including a polymeric layer and a release liner removably attached to the polymeric layer, where the release liner includes a conductive or semi-conductive material.

One or more embodiments of the present invention provides a laminate for creating a waterproof system, the laminate including a polymeric layer, a prepared surface on a location of the polymeric layer, and a release liner on the prepared surface, where the release liner includes a conductive or semi-conductive material.

One or more embodiments of the present invention also provides a static dissipative polymeric release liner for covering a prepared surface comprising a membrane made of polymeric material and carbon black dispersed in the polymeric matrix of said polymeric material, such that the static dissipative polymeric release liner exhibits a surface resistivity of from $10^5$ to $10^{11}$ ohms per square, and a static decay of less than 0.3 seconds.

DETAILED DESCRIPTION OF ILLUSTRATIVE EMBODIMENTS

One or more embodiments of the present invention are directed toward polymeric roofing articles and methods for their use. These articles are laminates that include a polymeric layer and a release liner, where the release liner is characterized by static dissipative properties. In certain embodiments, the article is a tape or solid adhesive, where the polymeric layer includes the adhesive layer and the release liner is attached to the adhesive layer to protect the adhesive during transportation, etc. In other embodiments, the article is a membrane or membrane accessory carrying an adhesive layer (e.g. tape), and the release liner is attached to the adhesive layer. In still other embodiments, the article is a membrane or membrane accessory including a primed area (and therefore carrying a residue of a primer), and the release liner is attached to the primed area.

The present invention is applicable to numerous polymeric laminate products. Examples of membranes or membrane accessories include membrane panels, walkway pads, cover strips, flashing strips, attachment strips, and seam/splice tapes.

Figure 1:
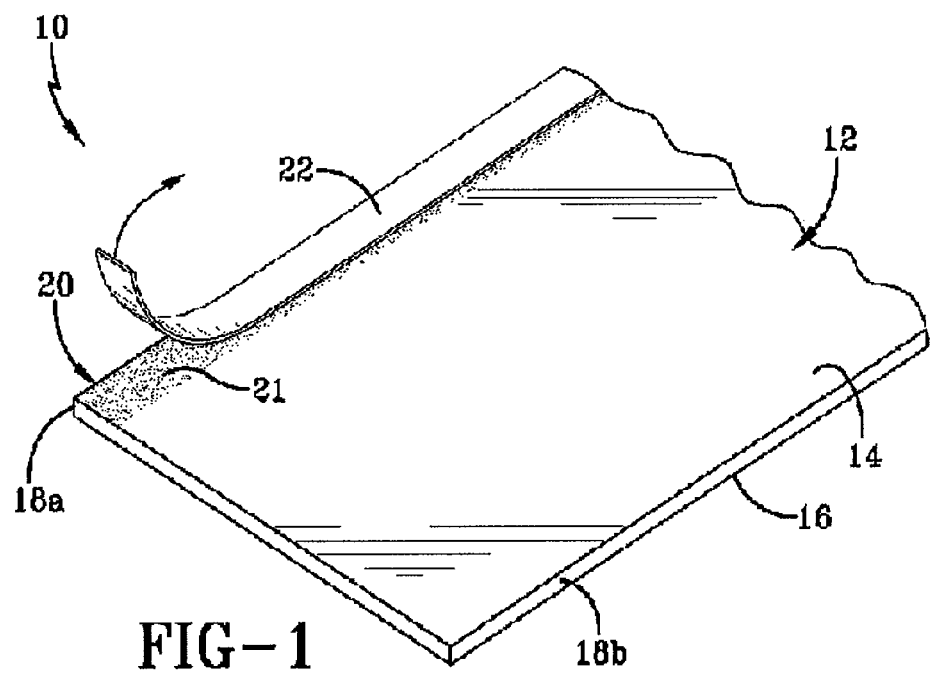
FIG. 1 is a fragmentary perspective view of a roofing membrane carrying a polymeric release liner in accordance with one embodiment of this invention, and is provided to illustrate an exemplary environment in which the polymeric release liner may be advantageously employed.

One environment in which the static dissipative release liner may be employed is shown in FIG. 1, wherein a roofing membrane assembly is generally indicated by the numeral 10. Membrane assembly 10 includes a membrane panel 12. Membrane panel 12 includes a top surface 14 and a bottom surface 16. Membrane panel 12 may be in the form an elongated strip and include a pair of spaced longitudinal edges 18a and 18b. In one or more embodiments, membrane panel 12 may be from about 25 to about 400 feet in the longitudinal direction. In these or other embodiments, membrane 10 may be from about 3 to about 50 feet in the transverse direction. In one or more embodiments, membrane panel 12 may be from about 12 feet to 20 feet in the transverse direction, and be about 100 feet in the longitudinal direction.

In one or more embodiments, the membrane may be a thermoset material. In other embodiments the membrane may be a thermoformable material. In one or more embodiments, the membrane may be EPDM based. In other embodiments, the membrane may be TPO based. In these or other embodiments, the membrane may be flexible and capable of being rolled up for shipment. In these or other embodiments, the membrane may include fiber reinforcement, such as a scrim. In one or more embodiments, the membrane includes EPDM membranes including those that meet the specifications of the ASTM D-4637. In other embodiments, the membrane includes thermoplastic membranes including those that meet the specifications of ASTM D-6878-03.

With reference again to FIG. 1, a roofing membrane assembly 10 is shown including membrane panel 12 having a prepared surface 20 on a portion of top surface 14 adjacent longitudinal edge 18a. Prepared surface 20 may be fabricated or applied within the factory or location where the membrane panel 12 is fabricated. Or it may be prepared or fabricated at another location. In any event, prepared surface 20 is fabricated prior to delivery of the membrane to its place of installment (e.g. the jobsite). Prepared surface 20 may include a primed surface or, in other embodiments, it also may include an adhesive surface, either of which is designated with the numeral 21. In one or more embodiments, prepared surface 20 may include a layer of material that is the residue of a primer applied to the location of prepared surface 20. In other embodiments, prepared surface 20 may include a layer of adhesive (such as a tape) applied in the location of prepared surface 20. In certain embodiments, membrane panel 12 is first primed and then an adhesive (e.g. tape) is applied over the primed area to form prepared surface 20.

A release liner 22 is positioned over prepared surface 20. In other words, release liner 22 is mated with and removably attached to prepared surface 20 through primer or adhesive layer 21. In one or more embodiments, primer layer or adhesive layer 21 provides sufficient tackiness to secure release liner 22 in place, but minimal tension (e.g. via hand force) will allow release liner 22 to be readily removed. As is known in the art, release liner 22 may advantageously provide protection to prepared surface 20 including the prevention of contaminates from contacting and collecting thereon.

Figure 2:
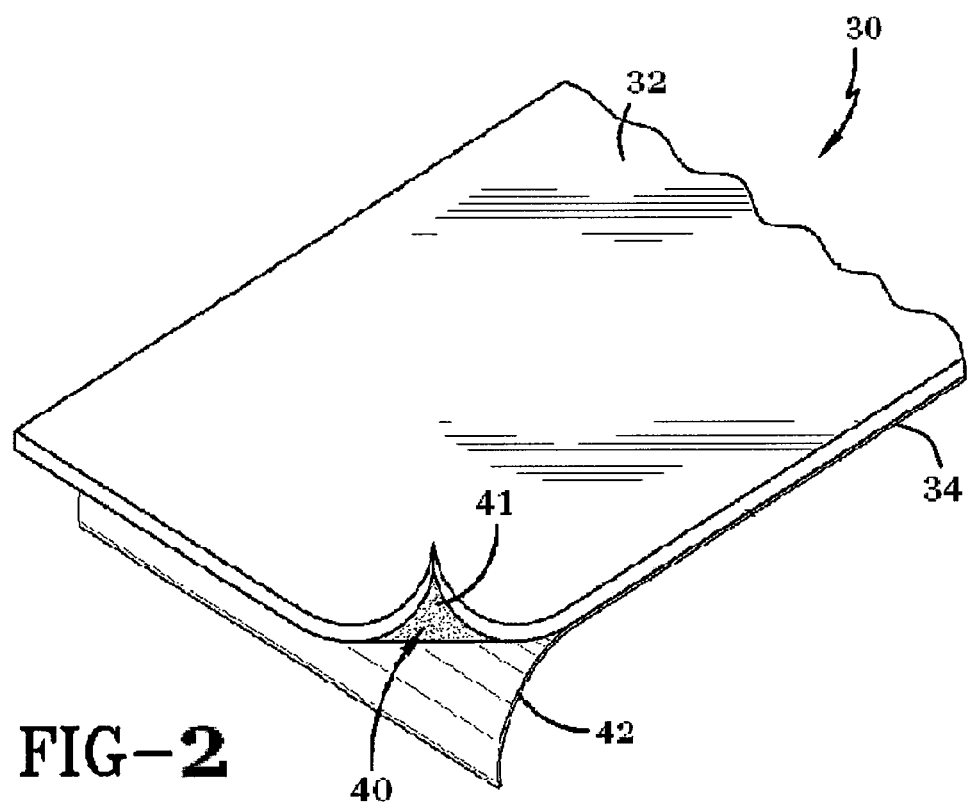
FIG. 2 is a fragmentary perspective view of a roofing membrane carrying a polymeric release liner in accordance with another embodiment of this invention.

Another embodiment of the present invention is shown in FIG. 2, which depicts a roofing membrane assembly 30 of the type know in the art as a fully adhered peel and stick membrane. Assembly 30 includes a first planar surface 32, which may be referred to as upper or top planar surface 32, and a second planar surface, which may be referred to as lower or bottom planar surface 34. Lower planar surface 34 of membrane panel 30 carries an adhesive layer 41 to form a prepared surface 40 that covers substantially all of lower planar surface 34. In one or more embodiments, adhesive layer 41 covers all of lower planar surface 34. A release liner 42 is removably attached to adhesive layer 41 opposite to lower planar surface 34. In one or more embodiments, release liner 42 substantially covers adhesive layer 41, and in other embodiments, release liner 42 covers all of adhesive layer 41.

In one or more embodiments, the release liners of the present invention (e.g. 22 and 42) may be between approximately 1 and 9 mils in thickness, in other embodiments between approximately 1 and 7 mils in thickness, in still other embodiments between approximately 2 and 6 mils in thickness, and in yet other embodiments between approximately 2 and 4 mils in thickness.

In one or more embodiments, release liner 22 (or 42) includes a polymeric film or extrudate. This polymeric film or extrudate may include a single polymeric layer or may include two or more polymeric layers laminated or coextruded to one another. In other embodiments, release liner 22 (or 42) includes a cellulosic substrate having a polymeric film or coating applied thereon, which film or coating may be referred to as a polymeric layer. The polymeric layer may be a single layer or include multiple layers.

Suitable materials for forming a release liner that is a polymeric film or extrudate include polypropylene, polyester, high-density polyethylene, medium-density polyethylene, low-density polyethylene, polystyrene or high-impact polystyrene. Suitable materials for forming a polymeric layer on a cellulosic-based release liner include siloxane-based materials, butadiene-based materials (e.g. styrene-butadiene rubber latex), as well as those polymeric materials employed to form a film or extrudate as described above. These polymeric materials may offer a number of advantageous properties including high moisture resistance, good resistance to temperature fluctuations during processing and storage, and increased tear and wrinkle resistance.

Release liner 22 (or 42) may be characterized by having desired static dissipative properties. These static dissipative properties are provided by the inclusion of materials that are capable of providing static dissipation to the release liner. These materials may be included in one or more of the layers of a polymeric film or extrudate forming the release liner or may be included in one or more layers of the polymeric layer of a cellulosic-based release liner.

Several materials can be employed that are capable of providing static dissipation to the release liner. These materials include static dissipative filler. In one or more embodiments, these materials include those that can be dispersed within the liner or a layer thereof and that are conductive or semi conductive so as to carry static charge to ground and thereby control the static charge. In one or more embodiments, the static dissipative material includes carbon black. Suitable conductive carbon blacks include any of the well known conductive carbon blacks obtained from the incomplete combustion of hydrocarbon vapors. These may include, without limitation, acetylene blacks, channel blacks, and furnace blacks.

In one or more embodiments, the conductive carbon blacks may have a weight average equivalence spherical particle diameter of from about 5 to about 500 nanometers. The equivalence spherical particle diameter of a given particle is the diameter of a sphere having the same volume. In one or more embodiments, the conductive carbon blacks may have a bulk density of from about 22 to about 32 pounds/cubic foot, and a surface area as determined by BET isotherm absorption of from about 100 to about 300, and in other embodiments from about 150 to 250 square meters per gram.

In one or more embodiments, the static dissipative filler is thoroughly disposed and in complete contact with the polymer matrix on a molecular level.

In one or more embodiments, the amount of static dissipative filler utilized in the composition should be sufficient to achieve a surface resistivity of between $10^5$ and $10^{11}$ ohms per square as determined by Federal Test Method Standard 101C, Method 4046. See also NFPA77 Recommended Practices on Static Electricity (2007) For example, the actual amount of carbon black needed to achieve the above static dissipative requirements will depend on the particular conductive carbon black used and on the particular polymers used in the composition. The static dissipative requirements can nonetheless often be met by utilizing a relatively broad range of conductive carbon black content.

In one or more embodiments, from about 5 parts to about 100 parts by weight of conductive carbon black for every 100 parts by weight of polymer, and in other embodiments from about 15 to about 50 parts by weight of conductive carbon black per 100 parts by weight of polymer is employed.

In one or more embodiments, release liners prepared in accordance with the invention can exhibit a surface resistivity of from $10^5$ to $10^{11}$ ohms per square, and a static decay of less than 0.3 seconds.

The polymeric compositions used to form the release liners of the present invention may further contain additives such as antioxidants, heat-resistant stabilizers, lubricants, flame retardants, pigments, plasticizers, UV-ray absorbers etc., which have been conventionally used.

The compositions used to prepare the release liners of the present invention can be prepared according to any known method. For example, they may be molded into pellets by mixing and kneading uniformly in a conventional manner by a suitable blender such as a kneader, Banbury mixer, mixing rolls, pressure kneader, etc. The pellets can then be molded, calendered, or extruded into sheets that can be thermoformed into release liners in accordance with the invention.

In one or more embodiments, by adding static dissipative filler (e.g. conductive carbon black) to polymeric release liners in accordance with this invention, the finished material is made static dissipative, and surface treatments are not necessary. In one or more embodiments, the carbon black is more effective and is not subject to removal, as compared to the surface treatments of the prior art (which are temporary).

Practice of the present invention does not necessarily alter the articles that carry the release liners of the present invention. Nor does practice of the present invention alter the manner in which the articles are installed. For example, and as is known in the art, the release liner can be removed from the articles without the use of excessive force, and the articles can be installed in place using known techniques. To the extent that previous methods of installing these roofing articles had to account for the discharge of static charge, practice of this invention may obviate precautionary measures that may have been taken on account of the static charge.

In one or more embodiments, the addition of the carbon black also renders the release liner black in color, which may be advantageous in many release liner applications. For example, when the release liner covers an adhesive to be used outdoors, the black release liner will absorb solar energy and raise the temperature of the adhesive, thus promoting adhesive flow, promoting adhesive wet-in and overall adhesion of the adhesive to the substrate. In a "peel and stick" roofing membrane, a black release liner can absorb solar energy and heat the adhesive, promoting the subsequent adhesion of the roofing membrane to a roof substrate, when the liner is removed. Also, particularly where the release liner includes a cellulosic substrate on which a polymeric coating is applied, the presence of a static dissipative filler (e.g. carbon black) will allow for the easy identification of any polymeric material that may be pulled away (i.e. removed) from the cellulosic substrate. As those skilled in the art appreciate, the adherence of release liner coating to the prepared surface (i.e. surface 20) can be deleterious to the formation of an integral waterproof surface.

Those skilled in the art will also appreciate that the static dissipative release liners of the present invention can advantageously be employed to cover primed, adhesive, or uncured surfaces of other polymeric membrane products or articles (e.g. laminate products). For example, the static dissipative release liners can be used on walkway pads that include pre-primed or factory applied adhesive layers. They can also be employed on flashing products that carry pre-primed or factory applied adhesive layers. Likewise, they can be used on attachment strips or cover strips that include pre-primed or factory applied adhesive layers. In other embodiments, the release liners of the present invention can be employed to cover adhesive tapes including those solid adhesive tapes employed in the roofing industry (e.g. EPDM and/or butyl based tapes). Still further, they can be employed on various geomembrane products including pond liners and liners for aquatic farms.

What is claimed is:

1. A laminate for creating a waterproof system, the laminate including:
    a polymeric roofing article; and
    a static dissipative release liner removably attached to the roofing article, where the release liner includes at least a single polymeric film having a conductive or semi-conductive material of carbon black dispersed within said single polymeric film, wherein said polymeric film is in direct contact with the roofing article.

2. The laminate of claim 1, where the polymeric roofing article is selected from the group consisting of a polymeric membrane panel, a walkway pad, an accessory, a flashing strip, a cover strip, and an attachment strip.

3. The laminate of claim 2, where the polymeric membrane panel is an EPDM membrane panel.

4. A laminate for creating a waterproof system, the laminate including:
a polymeric roofing article;
a prepared surface on a location of the polymeric roofing article; and
a static dissipative release liner on the prepared surface, where the release liner includes at least a single polymeric film having a conductive or semi-conductive material of carbon black dispersed within said single polymeric film, wherein said polymeric film is in direct contact with said prepared surface.

5. The laminate of claim 4, where the polymeric roofing article is selected from the group consisting of a polymeric membrane panel, a walkway pad, an accessory, a flashing strip, a cover strip, an adhesive tape and an attachment strip.

6. The laminate of claim 5, where the polymeric membrane panel is an EPDM membrane panel.

7. The laminate of claim 5, where the polymeric membrane panel is a thermoplastic membrane panel.

8. The laminate of claim 5, where the prepared surface includes a layer of primer residue.

9. The laminate of claim 5, where the prepared surface includes a layer of an adhesive.

10. The laminate of claim 1, where the prepared surface includes a solid tape applied to the membrane panel.

11. The laminate of claim 4, where the release liner includes carbon black in an amount from about 5 to about 100 parts by weight carbon black per 100 parts by weight polymer within the layer that includes the carbon black.

12. The laminate of claim 7, where the panel carries an adhesive layer covering substantially one planar surface of the panel, and where the release liner cover substantially all of the adhesive layer.

13. The laminate of claim 1, wherein said single polymeric film is black.

14. The laminate of claim 4, wherein said single polymeric film is black to absorb solar energy to promote adhesive flow of said prepared surface.

* * * * *